Figure 1:
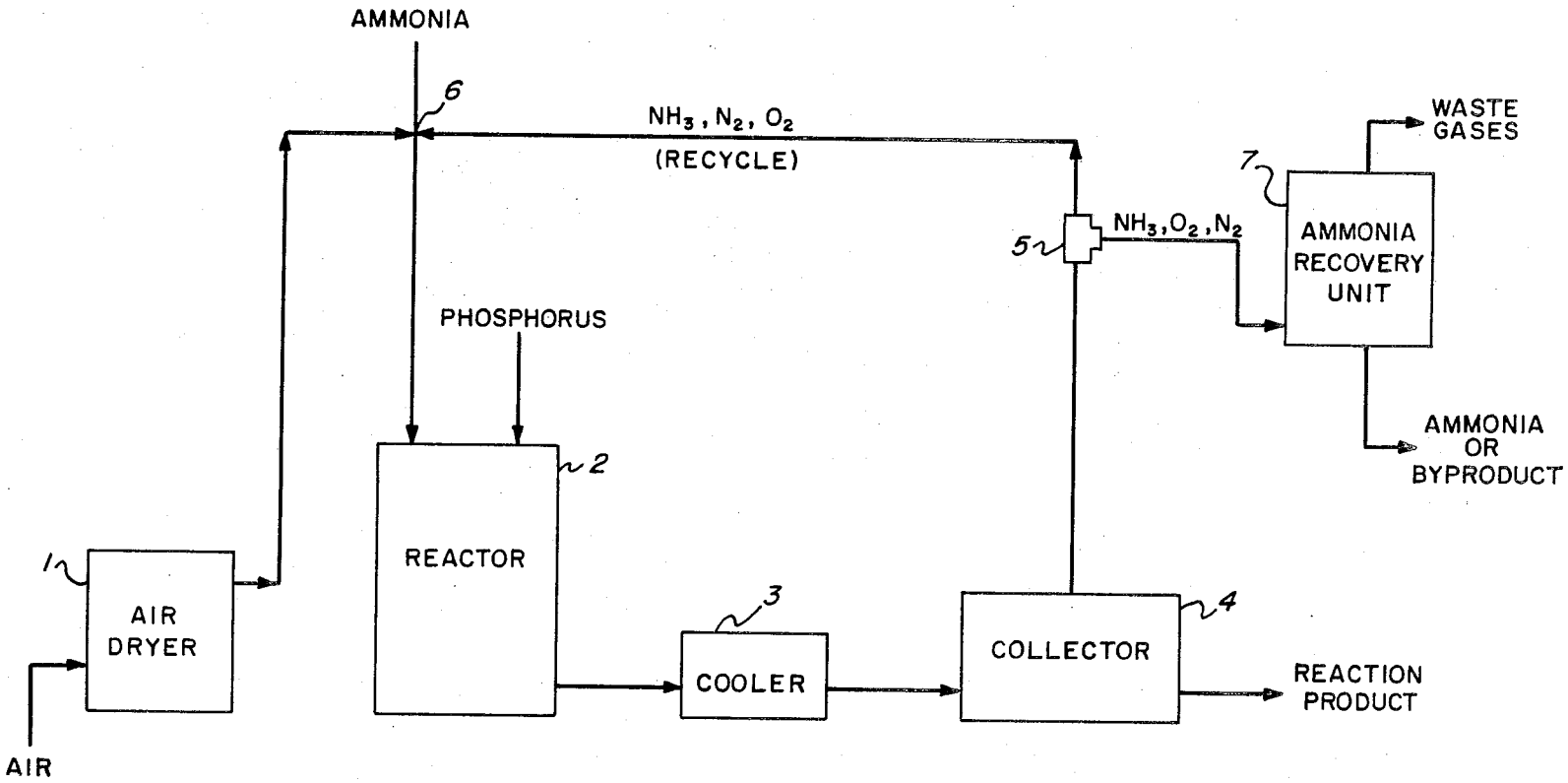
Figure 2:
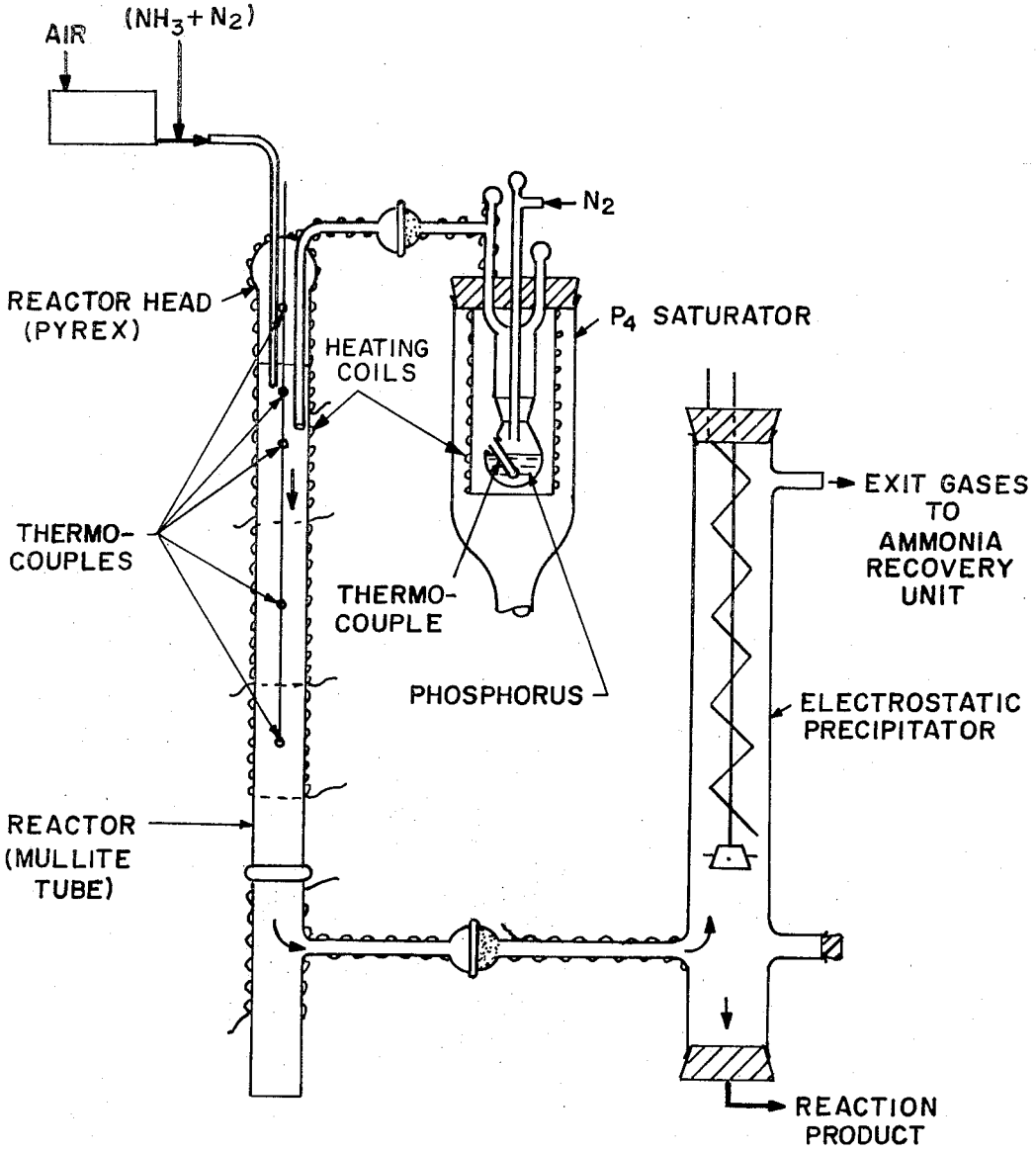
Figure 3:
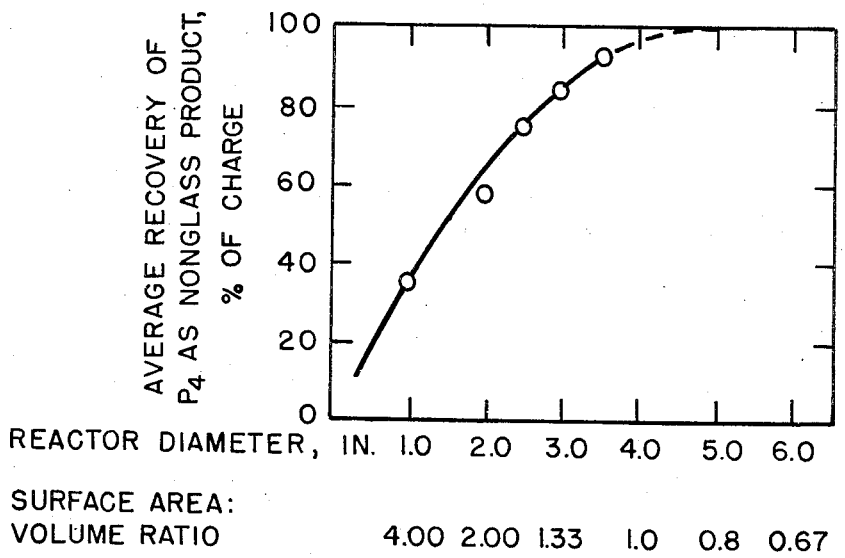

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 2, 1974

921 O.G. 9

T921,003

PRODUCTION OF NITROGEN-PHOSPHORUS COMPOUNDS

Harry T. Lewis, Jr., 802 Meadow Lane, and John G. Getsinger, 420 Eason, both of Florence, Ala. 35630

Filed Mar. 16, 1973, Ser. No. 341,908

**Int. Cl. C05f *3/00***

U.S. Cl. 71—32

3 Sheets Drawing. 27 Pages Specification

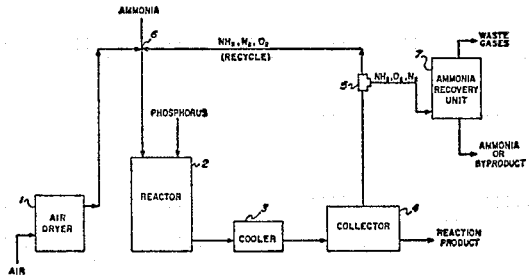

A vapor phase reaction process for production of concentrated nitrogen-phosphorus compositions. The process involves simultaneous reaction of elemental phosphorus with a low proportion of input ammonia and an excess of oxygen (air) in a single-stage reactor. Input oxygen (air) is in the range from greater than about 120 percent up to about 800 percent (all percents by weight), and most preferably 375 percent of that required to yield a $O_2$:$P_4$ mole ratio of 5. The quantity of input ammonia is in the range from greater than about 50 and less than about 80 percent of that required to yield a N:P atomic ratio of 2. The reactor (tube) is maintained at about 500° to 1300° F. and has a maximum surface area:volume ratio of about 0.8 in.$^2$/in.$^3$. Retention time of gases in reactor ranges from about 0.5 to 3.5 seconds at operating conditions, but 1 second is most preferred. Product of the reaction gases is collected as dry, white, amorphous solid. Products contain 14 to 16 percent N, 31 to 33 percent P, and up to 91 percent total plant nutrient content ($N+P_2O_5$ equivalent). Water solubility of the solid products is in the range from about 90 to 100 percent. Greenhouse tests indicate that the products are fully effective as fertilizer.

PRODUCTION OF NITROGEN-PHOSPHORUS COMPOUNDS

Filed March 16, 1973 3 Sheets-Sheet 1

FLOW SHEET FOR REACTING AMMONIA, PHOSPHORUS AND OXYGEN (AIR)

APPARATUS FOR SINGLE-STAGE REACTION OF PHOSPHORUS, AMMONIA, AND OXYGEN

EFFECT OF REACTOR SURFACE AREA: VOLUME RATIO ON RECOVERY OF NONGLASS PRODUCT FROM $NH_3 - P_4 - O_2$ REACTION